(12) United States Patent
Jain et al.

(10) Patent No.: US 8,732,008 B2
(45) Date of Patent: May 20, 2014

(54) DISPLAY ADS TESTING TOOL FOR RICH MEDIA DEVELOPERS

(75) Inventors: Kalpit Jain, Redmond, WA (US);
Venkatesh Manian, Bellevue, WA (US);
Matthew David Barbour, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 12/465,459

(22) Filed: May 13, 2009

(65) Prior Publication Data

US 2010/0293014 A1   Nov. 18, 2010

(51) Int. Cl.
*G06Q 30/00*   (2012.01)
*G06Q 90/00*   (2006.01)

(52) U.S. Cl.
CPC ..................... *G06Q 90/00* (2013.01)
USPC .......................................................... 705/14.1

(58) Field of Classification Search
CPC ...................................................... G06Q 90/00
USPC ......................................................... 705/14.1
See application file for complete search history.

(56) References Cited

U.S. PATENT DOCUMENTS

| | | |
|---|---|---|
| 7,181,468 B2 | 2/2007 | Spring |
| 2002/0078103 A1 | 6/2002 | Gorman |
| 2005/0204334 A1 | 9/2005 | Parthasarathy |
| 2007/0179892 A1 | 8/2007 | Chan |
| 2008/0195957 A1 | 8/2008 | Kim |
| 2008/0285892 A1* | 11/2008 | Sposato et al. ............... 382/311 |
| 2009/0031216 A1 | 1/2009 | Dressel |
| 2010/0082439 A9* | 4/2010 | Patel et al. ................. 705/14.72 |

OTHER PUBLICATIONS

"Live-Test": Preview for Banners http://www.adtech.info/edition_no1_int/newsletter_june06_live.htm 2008.
Atlas Rich Media & Video http://www.atlassolutions.com/uploadedFiles/Atlas/Atlas_Services/Rich_Media/ov-AtlasRichMediaVideo.pdf 2008.
Online Ad Management and Optimization: The Google Ad Manager is here to Optimize Advertising ROI http://www.masternewmedia.org/online_ad_management_and_optimization_the_google/ Sep. 11, 2008.
Cross-Browser Web Application Testing Made Easy http://www.ibm.com/developerworks/web/library/wa-crossbrowser/index.html Dec. 18, 2007.
Extending Fiddler with .NET Code http://www.fiddlertool.com/fiddler/dev/ifiddlerextension.asp 2009.
Introducing Fiddler http://www.fiddler2.com/fiddler2/ 2009.

* cited by examiner

*Primary Examiner* — Daniel Lastra
(74) *Attorney, Agent, or Firm* — Joann Dewey; Brian Haslam; Micky Minhas

(57) ABSTRACT

An ad test tool allows rich media developers to test ads in both a stand-alone environment and within live web pages. The ad test tool includes a stand-alone ad test tool, a live site ad test tool, and a rules and compliancy engine. The stand-alone ad test tool tests ads in a stand-alone environment by providing the ad rendering framework necessary to render ads on the user's local device. The live site ad test tool tests ads on live web pages. The live site ad test tool includes a proxy that intercepts ad requests from web pages and replaces the ads on the web pages with test ads. The rules and compliancy engine checks test ads for compliancy for security and privacy purposes and also verifies that click tracking and/or impression tracking operate properly.

20 Claims, 15 Drawing Sheets

DISPLAY ADS TESTING TOOL FOR RICH MEDIA DEVELOPERS

BACKGROUND

Rich media is a rapidly growing area within display advertising. Rich media ads are capable of numerous features including, for instance, playing sound and video, expanding, animation, and numerous other functions that an advertiser may use to engage with a user. Many major portals and networks, such as MSN, Yahoo and AOL, rely upon rich media ads on their networks to increase yield across their advertising inventory. Additionally, many leading brand advertisers are showing a preference for rich media ads as they allow for users to engage and interact with the ad in a variety of ways. Rich media ads also allow advertisers to track any number of actions within the ad unit. In one example, more than 70 user actions were recorded via a rich media ad to understand how a consumer would interact with a product.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to an ad test tool that allows developers to test rich media ads. In some embodiments, the ad test tool includes a stand-alone ad test tool that allows ads to be tested in a stand-alone environment by providing the ad rendering framework necessary to render ads on the user's local device. The ad test tool also includes a live site ad test tool that allows ads to be tested on live web pages. The live site ad test tool includes a proxy that intercepts ad requests from web pages and replaces the ads on the web pages with test ads. In further embodiments, the ad test tool includes a rules and compliancy engine that checks test ads for compliancy for security and privacy purposes and also verifies that click tracking and/or impression tracking operate properly.

BRIEF DESCRIPTION OF THE DRAWINGS

The present invention is described in detail below with reference to the attached drawing figures, wherein.

DETAILED DESCRIPTION

Figure 1:
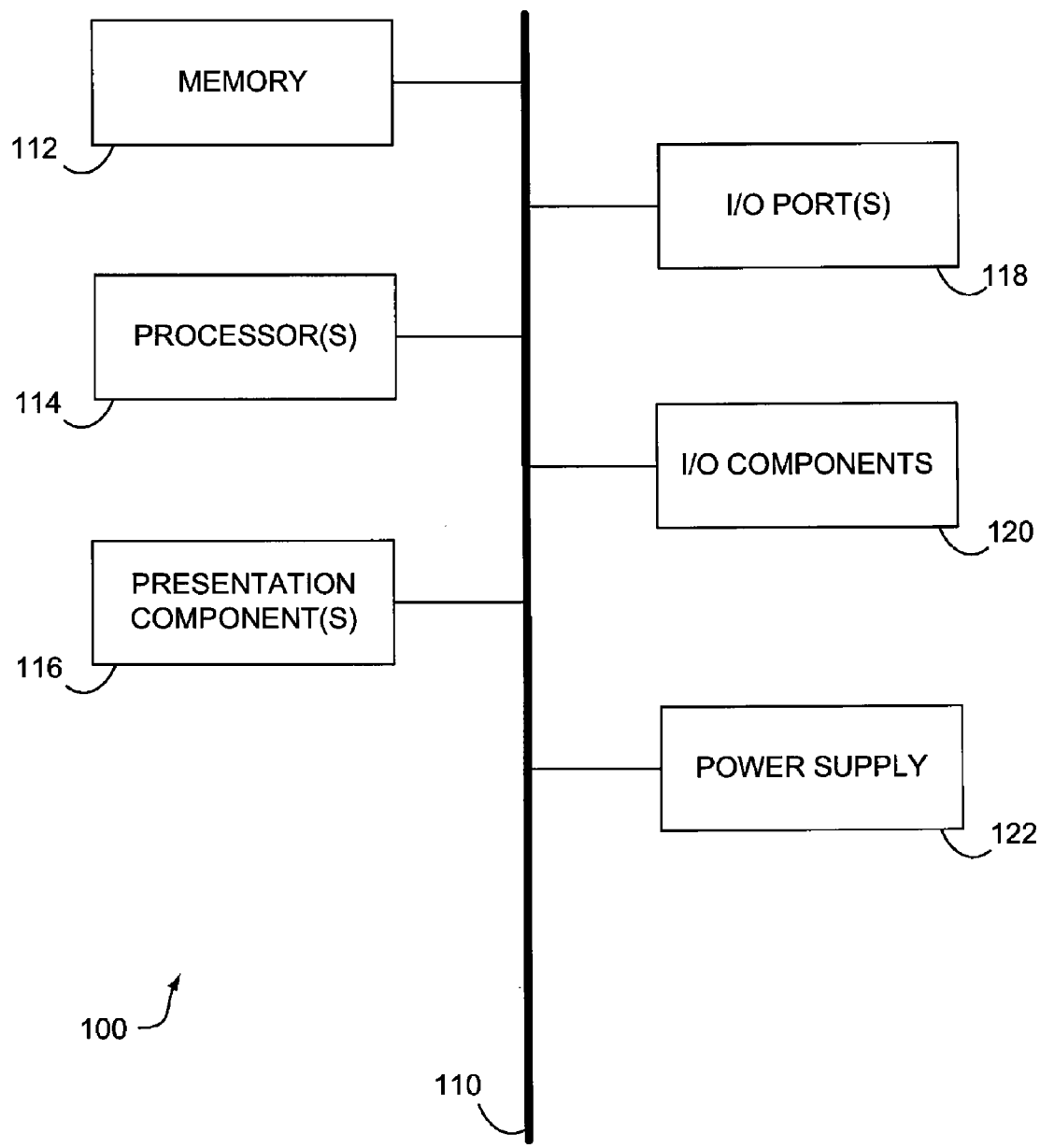
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

There are a number of advertising delivery systems that facilitate the delivery of rich media ads to publisher web pages. Each of the advertising delivery systems include a specific framework for rendering ads. Embodiments of the present invention provide an ad test tool that enables rich media developers to create and test their ads in an advertising delivery system's ad rendering framework before submitting to the advertising delivery system for running their ads. As such, the ad test tool enables rich media developers to adapt to the advertising delivery system's guidelines, policies, and specifications to ensure that the ads will properly render when delivered to a publisher web page. Additionally, the ad testing tool helps in identifying and resolving rich media ad issues.

Generally, the ad test tool includes a stand-alone ad test tool, a live site ad test tool, and a rules and compliancy monitoring engine. A developer may enter test ads into the ad test tool by entering ad tags, ad IDs, and/or URLs at which test ads are located. The stand-alone ad test tool operates in a stand-alone environment to determine whether an ad can render properly using the advertising delivery system's rendering framework. The live site ad test tool identifies ads on live web pages and replaces the ads with test ads, thereby allowing developers to get a live site preview of test ads such that the ads may be tested within the environment of live web pages. In both the stand-alone testing environment and the live site testing environment, the ad test tool may rotate test ads for refresh testing purposes. The rules and compliancy monitoring engine test ads for security and policy compliancy, as well as impression and click tracking compliancy.

Accordingly, the ad test tool allows rich media developers to ensure that key features of an ad will work in both a stand-alone environment as well as an integrated ad environment (i.e., a live site preview of ads in the context of publisher web pages). For Ajax based applications, rich media developers can employ the ad test tool to ensure that ads do no leave any remnant HTML, java script and images on the page. In other words, developers can use the ad test tool to ensure that upon refresh, rendered ad content for their ads is properly "flushed out." Further, developers can verify that their rich media ads are compliant from a security, privacy and click/impression tracking perspective.

As such, in one aspect, an embodiment of the present invention is directed to a computer-storage medium including computer-useable instructions that, when performed by a computing device, cause the computing device to perform a method for testing an ad in a web page. The method includes receiving a test ad in an ad test tool and receiving a selection of a web page for testing the test ad. The method also includes receiving the web page, wherein the web page includes an ad markup for an ad from a remote advertising delivery system, the ad markup causing an ad request to be generated. The method further includes intercepting, via a proxy, the ad request and replacing the ad markup in the web page with ad markup for the test ad. The method still further includes rendering and displaying the test ad in the web page using the ad markup for the test ad.

In accordance with another embodiment, an aspect of the invention is directed to a computer-storage medium storing a system for testing ad, the system including a number of software components. The software components include a test ad entry component, a stand-alone ad test component, and a live site ad test component. The test ad entry component allows a user to enter one or more test ads. The stand-alone ad test component facilitates testing the one or more ads using a rendering framework of an advertising delivery system in a stand-alone environment. The live site ad test component facilitates replacing one or more ads on a live web page with at least one of the one or more test ads.

A further embodiment of the present invention is directed to a computer-implemented method for testing an ad using an ad test tool. The method includes receiving a test ad via the ad test tool, and rendering and displaying the test ad in a stand-alone environment using a rendering framework of an advertising delivery system provided locally by the ad test tool. The method also includes replacing the rendered and displayed test ad with a second test ad by rendering and displaying the second test ad. The method further includes receiving a selection of a web page for testing the test ad and receiving the web page, wherein the web page includes an ad markup for an ad from a remote advertising delivery system, the ad markup causing an ad request to be generated. The method also includes intercepting, via a proxy, the ad request, determining an ad size corresponding with the ad markup for the ad from the advertising delivery system, and selecting the test ad based on a determination that the test ad has an ad size matching the ad size corresponding with the ad markup for the ad from the advertising delivery system. The method further includes replacing the ad markup in the web page with ad markup for the test ad. The method still further includes rendering and displaying the test ad in the web page using the ad markup for the test ad.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
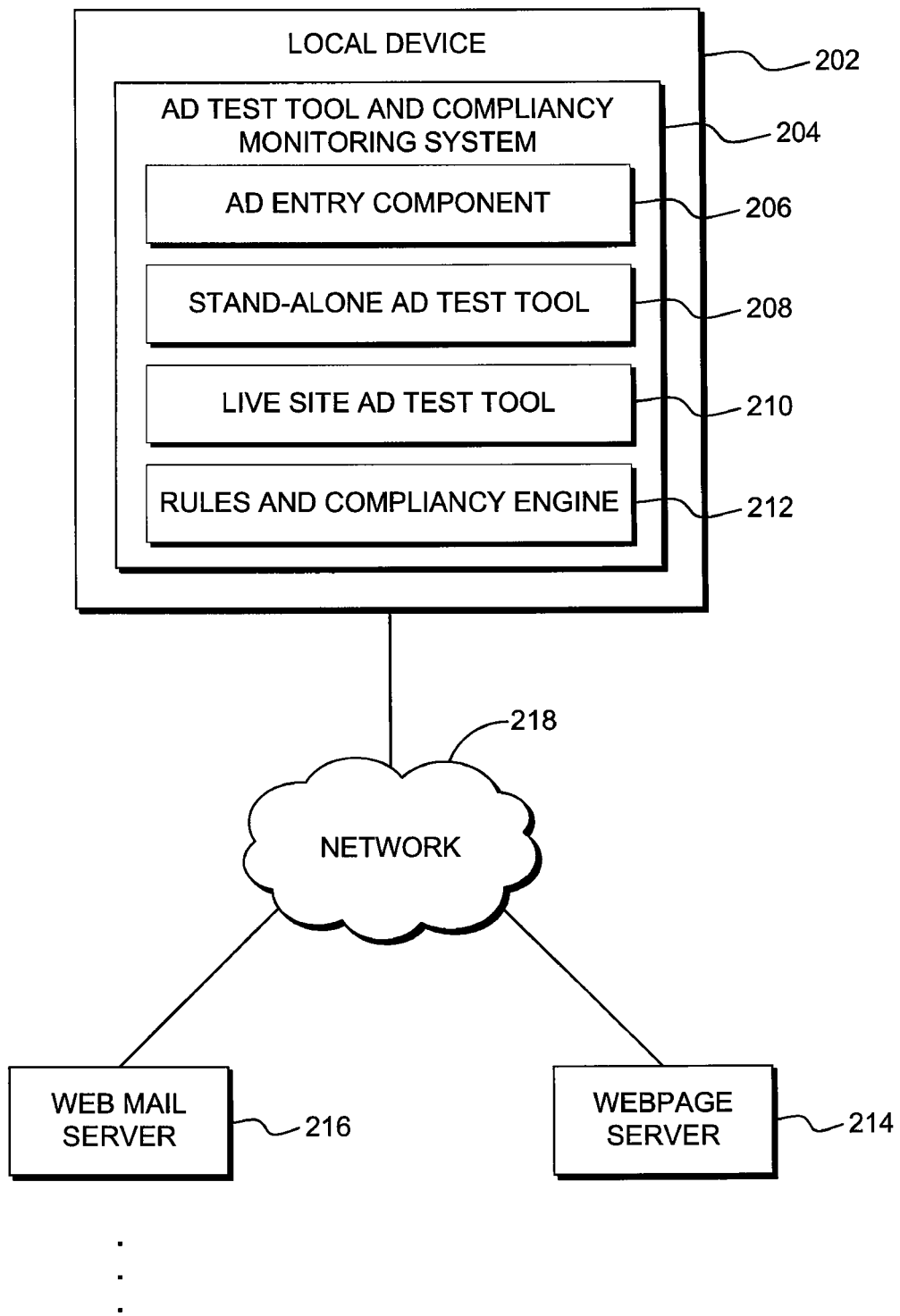
FIG. 2 is a block diagram is an exemplary system in which embodiments of the present invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a local device 202 hosting an ad test tool and compliancy system 204, which may be employed by a user to perform ad testing. The local device 202 may be any type of computing device, such as computing device 100 described with reference to FIG. 1, for example. As shown in FIG. 2, the ad test tool and compliancy monitoring system 204 generally includes an ad entry component 206, a stand-alone ad test tool 208, a live site ad test tool 210, and a rules and compliancy engine 212. The ad test tool and compliancy monitoring system generally allows a user to test ads in both a stand-alone mode and on live web pages using the ad rendering framework of a given advertising delivery system. As such, the user may test ads prior to submitting the ads to the advertising delivery system to ensure the ads operate properly and comply with the requirements of the advertising delivery system.

The ad entry component 206 allows the user to enter ads for testing purposes. Additionally, the ad entry component 206 may allow the user to specify the ad size corresponding with each test ad. In one embodiment, the ad entry component 206 allows the user to enter one or more ad tags, which are each a block of text/script/code (text, htm or java script) provide by the user for rendering the test ads. The ad entry component 206 may also allow the user to enter ads for testing purposes by specifying an ad ID, to identify an ad currently within the advertising delivery system. As such, the ad test tool and compliancy monitoring system 204 may be used to test ads that have already been submitted to the advertising delivery system, for instance, to identify and resolve rich media ad issues. In further embodiments, the ad entry component 206 may allow the user to enter ads by specifying a URL at which an ad is located. Any and all such variations are contemplated within the scope of embodiments of the present invention. In some embodiments, the ad entry component 206 may allow the user to group ads for refresh testing purposes. In particular, ads within a group may be used to sequentially replace one another for testing refresh performance.

The stand-alone ad test tool 208 facilitates testing ads in a stand-alone environment. In particular, the stand-alone ad test tool 208 provides the user with the environment to test ads on the local device 202 to simulate rendering the ads within the context of the advertising delivery system's rendering platform. As such, the user can determine whether a test ad can render properly within the advertising delivery system's platform before actually submitting the ad to the advertising delivery system. Additionally, the user can test ads already submitted to the advertising delivery system in a stand-alone environment to identify and resolve issues with the ads. In some embodiments, the stand-alone ad test tool 208 includes a refresh feature for refresh testing purposes. When selected by a user, the refresh feature causes test ads to rotate such that one test ad is rendered and replaces a previously rendered ad. As discussed above, in some embodiments, test ads may be grouped together for refresh testing purposes, while in other embodiments, the stand-alone ad test tool 208 may simply use all test ads as a pool of ads to select from for refresh testing purposes.

The live site ad test tool 210 facilitates rendering a test ad in a live web page, such as, for instance a web page delivered by the web page server 214 or the web mail server 216 via network 218. The live site ad test tool 210 includes a system proxy that monitors network traffic for the local device 202. The proxy intercepts ad requests from live web pages and replaces the live ad markup in the web pages with test ads. As such, the web pages are displayed in the user's web browser with test ads. Since the user may enter multiple test ads, the live site ad test tool may use the ads as a source pool and rotate ads in the live web pages that are rendered and displayed in the user's web browser. In some embodiments, test ads may be grouped together for refresh purposes, while in other embodiments, the stand-alone ad test tool 208 may simply use all test ads as a pool of ads to select from for refresh purposes.

In some embodiments, the live site ad test tool 210 may replace ads on only predetermined web pages, while in other embodiments, the live site ad test tool 210 may replace ads on any web page. Additionally, in some embodiments, the live site ad test tool 210 attempts to replace ads from web pages with test ads having the same ad size. In such embodiments, the live site ad test tool 210 determines the size of an ad within a web page and attempts to select a test ad having the same size. In some embodiments, the live site ad test tool 210 is also configured to operate with any web browser installed on the local device 202. As such, the user may test ad rendering in various web browser environments.

The rules and compliancy engine 212 checks ad scripts for compliancy purposes to ensure that the test ads comply with the advertising delivery system's guidelines, policies, and specifications and ensure that ads are compliant from a security and privacy perspective. For instance, the rules and compliancy engine 212 may determine whether the test ads show java script errors or install active x controls. Additionally, the rules and compliancy engine 212 test ads for impression tracking and click tracking compliance to ensure that test ads are compliant from an impression tracking and click tracking perspective. In some embodiments, the rules and compliancy engine 212 may also test for Interactive Advertising Bureau (IAB) guidelines to ensure that ads are compliant based in IAB recommendations (e.g., ad size, file weight, etc.).

Although the system 200 of FIG. 2 illustrates an ad test tool and compliancy monitoring system 204 installed on a local device 202, it should be understood that in some embodiments of the present invention, some or all components of the ad test tool and compliancy monitoring system 204 may be located on a remote device (not shown), and the local device 202 may include a client application for accessing the components (which in some instance may simply be a web browser). Any and all such variations are contemplated to be within the scope of embodiments of the present invention.

Figure 3:
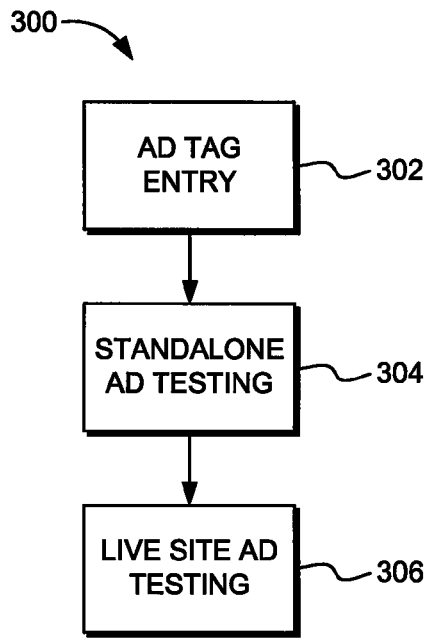
FIG. 3 is a flow diagram showing an overall method for testing ads using an ad testing tool in accordance with an embodiment of the present invention.

Referring now to FIG. 3, a flow diagram is provided that illustrates an overall method 300 for testing an ad using an ad testing tool, such as the ad test tool and compliancy monitoring system 204 of FIG. 2, in accordance with an embodiment of the present invention. Initially, as shown at block 302, a user enters one or more ad tags into the ad testing tool. The ad tags correspond with ads that the user wishes to test using the ad testing tool. Additionally or alternatively, the user may identify one or more test ads using an ad ID or a URL.

As shown at block 304, stand-alone ad testing is performed on the test ads entered by the user. In particular, the ads are tested in a stand-alone environment that simulates rendering the ad within the context of the advertising delivery system's platform. In some embodiments, the stand-alone ad testing may include rotating ads for refresh testing purposes. Stand-alone ad testing will be further described below with reference to FIG. 4.

Next, live site ad testing is performed on the test ads entered by the user, as shown at block 306. Live site ad testing includes rendering test ads in a live web page to ensure that the test ads render and display properly within an actual live web page environment. Live site ad testing will be described in further detail below with reference to FIGS. 5 and 6.

Although the method 300 illustrates a user entering test ads and performing both stand-alone ad testing and live site ad testing, ad test tools in accordance with various embodiments of the present invention may allow the user to perform either stand-alone testing or live site ad testing individually. Any and all such variations are contemplated to be within the scope of embodiments of the present invention.

Figure 4:
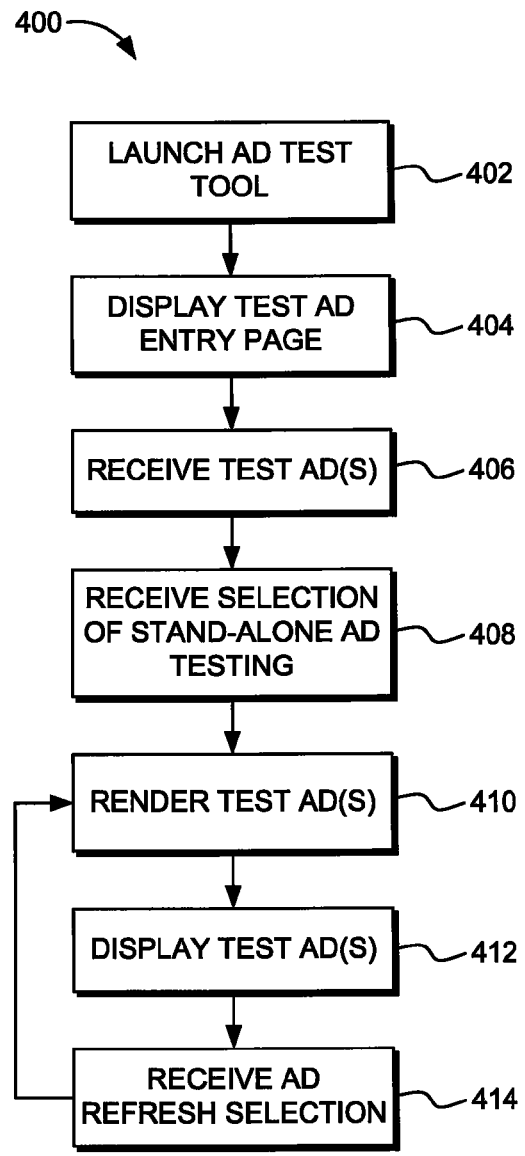
FIG. 4 is a flow diagram showing a method for stand-alone ad testing in accordance with an embodiment of the present invention.

Turning to FIG. 4, a flow diagram is provided that shows a method 400 for performing a stand-alone ad test in accordance with an embodiment of the present invention. Initially, as shown at block 402, the ad test tool is launched. After launching the ad test tool, a test ad entry page is displayed, as shown at block 404. The test ad entry page allows the user to enter one or more ad tags for the test ads. Additionally or alternatively, the test ad entry page may allow a user to specify test ads using ad IDs or URLs. As shown at block 406, a user enters at least one test ad via an ad tag, ad ID, or URL, which is received by the ad test tool in the test ad entry page.

As indicated previously, the ad test tool may be configured to provide stand-alone ad testing and live site ad testing. In the present embodiment, the user selects to perform stand-alone ad testing. As such, selection of stand-alone ad testing is received, as shown at block 408. Based on the selection of stand-alone ad testing, ads corresponding with the ad tags, ad IDs, or URLs that were entered at block 404 are rendered, as shown at block 410. The test ads are rendered using the rendering framework of an advertising delivery system that is provided by the ad test tool in the stand-alone environment. The rendered ads are displayed in the ad test tool at block 412.

As noted above, in some embodiments of the present invention, the ad test tool provides the ability to refresh ads. In an embodiment, the ad test tool allows AJAX refresh of ads entered on the ad tag entry page. For example, a developer may wish to ensure that its ads do not leave any remnant HTML, java script, and images on the page. By allowing a developer to refresh ads, the developer may ensure that rendered ad content from their ads is properly "flushed out" upon refresh. As shown at block 414, an ad refresh selection is received by the ad test tool. Based on the ad refresh selection, a new test ad is selected and used to replace a currently displayed ad.

Figure 5:
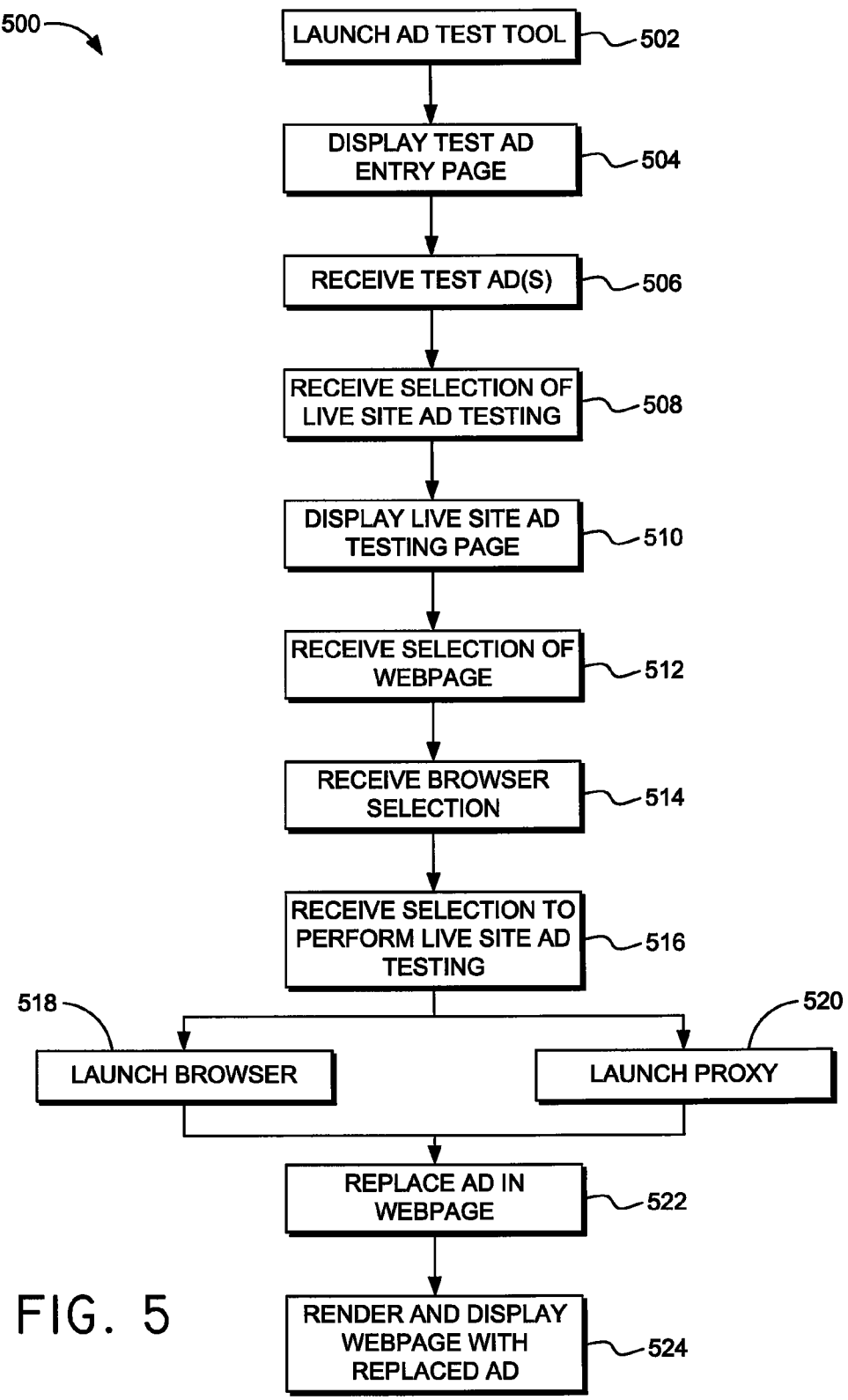
FIG. 5 is a flow diagram showing a method for live site ad testing in accordance with an embodiment of the present invention.

Referring now to FIG. 5, a flow diagram is provided that shows a method 500 for performing a live site ad test in accordance with an embodiment of the present invention. Initially, as shown at block 502, the ad test tool is launched. After launching the ad test tool, a test ad entry page is displayed, as shown at block 504. As indicated above with reference to FIG. 4, the test ad entry page of an ad test tool allows the user to enter one or more ad tags. Additionally or alternatively, the ad tag entry page may allow a user to specify test ads using ad IDs or URLs. As shown at block 506, a user enters at least one test ad via an ad tag, ad ID, or URL, which is received by the ad test tool in the test ad entry page.

In the present embodiment, the user selects to perform live site ad testing, as shown at block 508. In response to selection of live site testing, a live site ad testing page is displayed, as shown at block 510. Using the live site ad testing page, the user enter a web page at which the user would like to test an ad. As such, selection of a web page is received by the ad test tool at block 512. This may include the user entering the URL for the web page. In some embodiments, the user may also specify a specific web browser for testing an ad. For instance, as shown at block 514, a web browser selection is received from the user via the live site ad testing page. After the user identifies a particular web page and a particular web browser, the user indicates to perform live site ad testing, as shown at block 516. In response to the command to perform the live site ad testing, the specified web browser is launched at block 518. Additionally, a web proxy is launched at block 520.

Using the proxy, an ad in the specified web page is replaced using a test ad entered in the test ad entry page, as shown at block 522. As will be described in further detail below with reference to FIG. 6, the proxy intercepts an ad request in the web page and replaces the ad in the web page with a test ad. The web page is rendered and displayed with the replaced ad, as shown at block 524.

Figure 6:
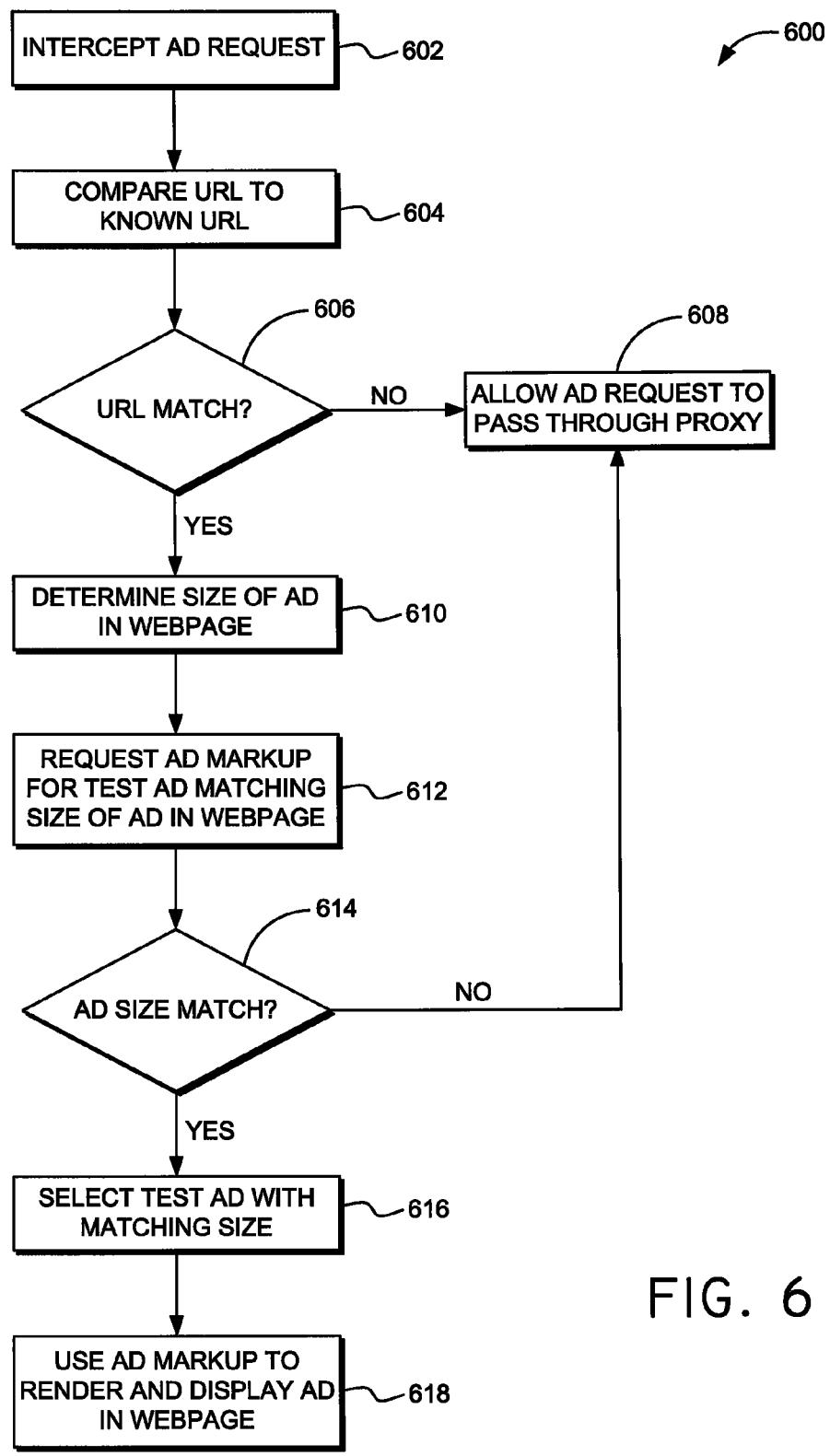
FIG. 6 is a flow diagram showing a method for using a proxy to replace an ad in a web page with a test ad in accordance with an embodiment of the present invention.

With reference now to FIG. 6, a flow diagram is provided that shows a method 600 for using a proxy to replace an ad in a web page with a test ad in accordance with an embodiment of the present invention. The proxy operates by monitoring web traffic and identifying ad requests. In particular, when a requested web page is received, the web page may include an ad markup for requesting an ad from an advertising delivery system. The ad markup causes an ad request to be generated and sent to the advertising delivery system. As shown at block 602, the proxy intercepts the ad request.

In some embodiments, the proxy may operate to replace ads delivered from any advertising delivery system. In others embodiments, such as the embodiment shown in FIG. 6, the proxy operates to replace ads only from identified advertising delivery systems. This may be done, for instance, by comparing the URL of the ad request to a known URL for a particular advertising delivery system, as shown at block 604. If the URL of the ad request does not match a known URL at block 606, the ad request is allowed to pass through the proxy, as shown at block 608. As such, an ad from the advertising delivery system is not replaced with a test ad. Alternatively, if the URL of the ad request matches a known URL at block 606, the process continues by attempting to place a test ad within the web page.

In some embodiments of the present invention, test ads may be selected to replace an ad in a web page regardless of ad size. In other embodiments, such as that shown in FIG. 6, an ad within a web page is replaced with a test ad only if there is a test ad having an ad size that matches the size of the ad within the web page. As shown in block 610, the size of the ad within the web page is determined. The size of the ad may be determined in a number of different ways within the scope of embodiments of the present invention. In embodiments, the ad test tool attempts to replace an ad with a test ad that matches the size of the ad in the web page. As such, as shown at block 612, ad markup for a test ad matching the size of the ad in the webpage is requested. Based on the request, it is determined whether there is a test ad that matches the size of the ad in the web page, as shown at block 614. If there is not a test ad that matches the size of the ad in the web page, the ad request is allowed to pass through the proxy at block 608 and an ad from the advertising delivery system is not replaced with a test ad. Alternatively, if a test ad having a matching size is identified at block 614, the process continues by selecting the test ad with a matching size, as shown at block 616. After selecting the test ad, ad markup for the test ad is used to render and display the test ad in the web page, as shown at block 618.

Embodiments of the present invention will now be described with reference to FIGS. 7-17, which include exemplary screen displays of an ad test tool allowing entry of ad tags and both stand-alone ad testing and live site ad testing. It will be understood and appreciated by those of ordinary skill in the art that the screen displays of FIGS. 7-17 are provided by way of example only and are not intended to limit the scope of the present invention in any way.

Figure 7:
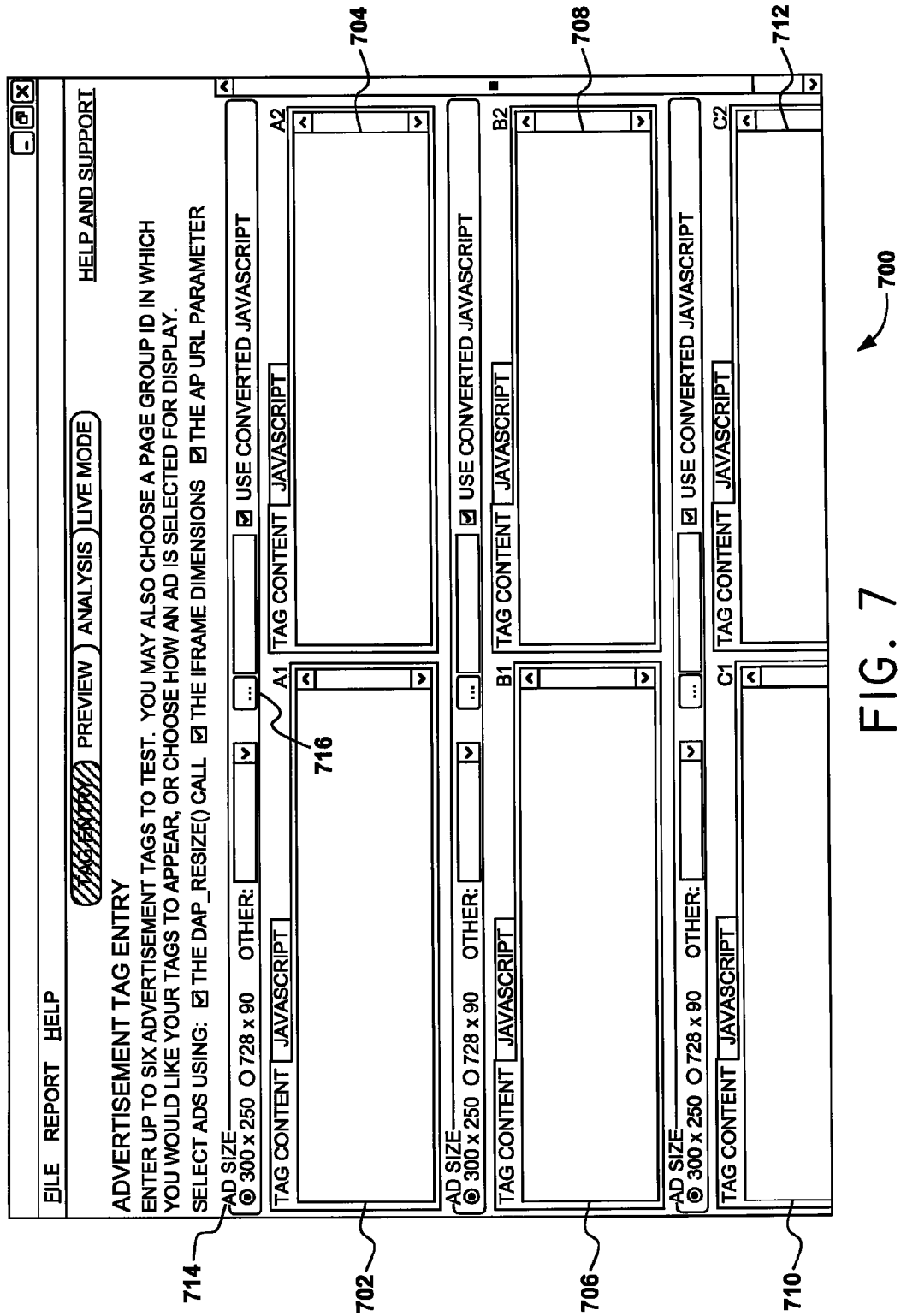
FIG. 7 is an illustrative screen display of an exemplary ad tag entry page of an ad testing tool in accordance with an embodiment of the present invention.

With reference initially to FIG. 7, an illustrative interactive screen display (user interface) 700 for an ad tag entry page of the ad testing tool is shown. The tag entry page includes a number of ad tag entry areas allowing a user to enter ad tags for test ads, including ad tag entry areas 702, 704, 706, 708, 710, 712. As such, the tag entry page 700 allows a user to enter multiple ad tags, thereby facilitating the testing of multiple ads. Although areas for six ad tags is shown in FIG. 7, it should be understood that any number of tag entry areas may be provided within a tag entry page within the scope of embodiments of the present invention.

Each ad tag entry area is associated with an ad identifier, facilitating user identification of test ads during ad testing as will be described in further detail below. For instance, ad tag entry area 702 corresponds with ad identifier A1, ad tag entry area 704 corresponds with ad identifier A2, ad tag entry area 706 corresponds with ad identifier B1, ad tag entry area 708 corresponds with ad identifier B2, ad tag entry area 710 corresponds with ad identifier C1, and ad tag entry area 712 corresponds with ad identifier C2.

In accordance with the embodiment shown in FIG. 7, ad tag entry areas are provided in pairs for refresh testing purposes. For instance, ad tag entry areas 702 and 704 allow entry of ad tags that when testing is performed, the ad tag from one ad tag entry area may be replaced with the ad tag from the other ad tag entry area upon refresh. As noted above, refresh testing allows ads to be rotated to determine whether the test ads are properly "flushed" when replaced by another ad. Similarly, ad tag entry areas 706 and 708 and ad tag entry areas 710 and 712 provide additional pairs for refresh testing purposes. Although ad tag entry areas are shown in pairs for refresh testing purposes in FIG. 7, it should be understood that other approaches may be employed for associating ad tags for refresh testing purposes.

The user may specify the ad size for each ad tag using an ad size area, such as the ad size area 714. For instance, the ad size may be specified by selecting "300×250," "728×90" or using an "OTHER" drop down box. It should be recognized that any ad size may be employed by the ad testing tool and presented for selection in the tag entry page 700.

In accordance with some embodiments of the present invention, after an ad tag has been entered in an ad tag entry area, the ad tag is converted to JavaScript compliant format. As shown in FIG. 7, the user may select a JavaScript tab, such as the JavaScript tag 716 corresponding with ad tag entry area 702, to view the ad tag in the JavaScript compliant format.

In addition to allowing a user to manually enter an ad tag in the tag entry page 700, the ad testing tool in some embodiments allows a user to specify an ad ID and/or an ad URL for selecting a test ad. Additionally, the ad testing tool may target a particular page group, representing a group of web pages, for live site ad testing. For instance, an ad replacement button, such as the ad replacement button 716, may be provided corresponding with an ad tag entry area.

Figure 8:
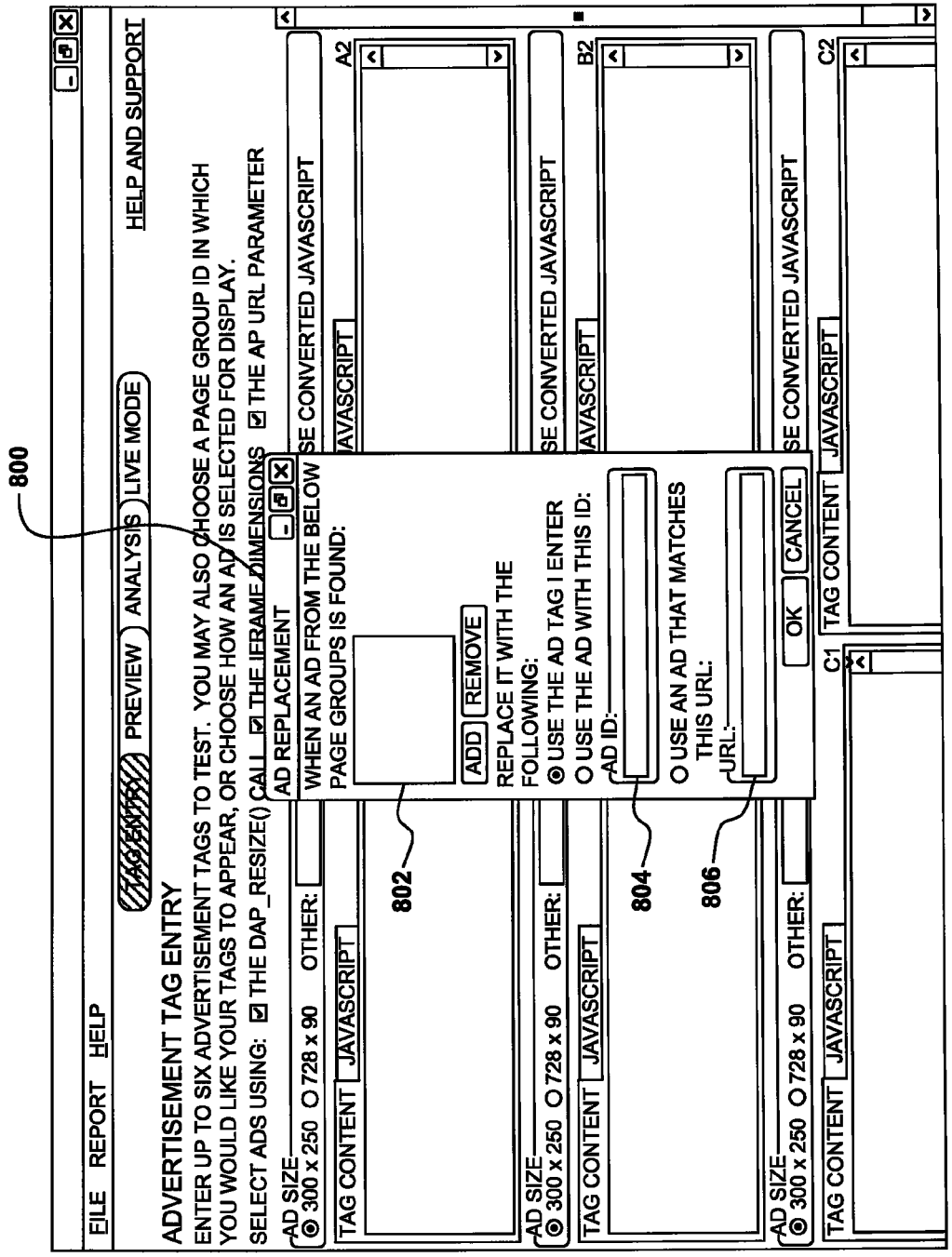
FIG. 8 is an illustrative screen display of a window allowing a user to specify a page group, ad ID, and/or ad URL for ad testing in accordance with an embodiment of the present invention.

When the user selects the ad replacement button 716 in FIG. 7, an ad replacement window 800 is presented, as shown in FIG. 8. The ad replacement window 800 includes a page group area 802 allowing a user to specify page groups. If the user enters a page group in the page group area 802, ad tags corresponding with the current ad tag entry area will only be used to replace ads on pages within the page group.

The ad replacement window 800 also allows a user to specify an ad tag using an ad ID and/or a URL. As shown in FIG. 8, the ad replacement window 800 includes an ad ID area 804, allowing the user to enter an ad ID for an ad. Additionally, the ad replacement window 800 includes an ad URL area 806 that allows a user to enter a URL at which an ad is located.

Figure 9:
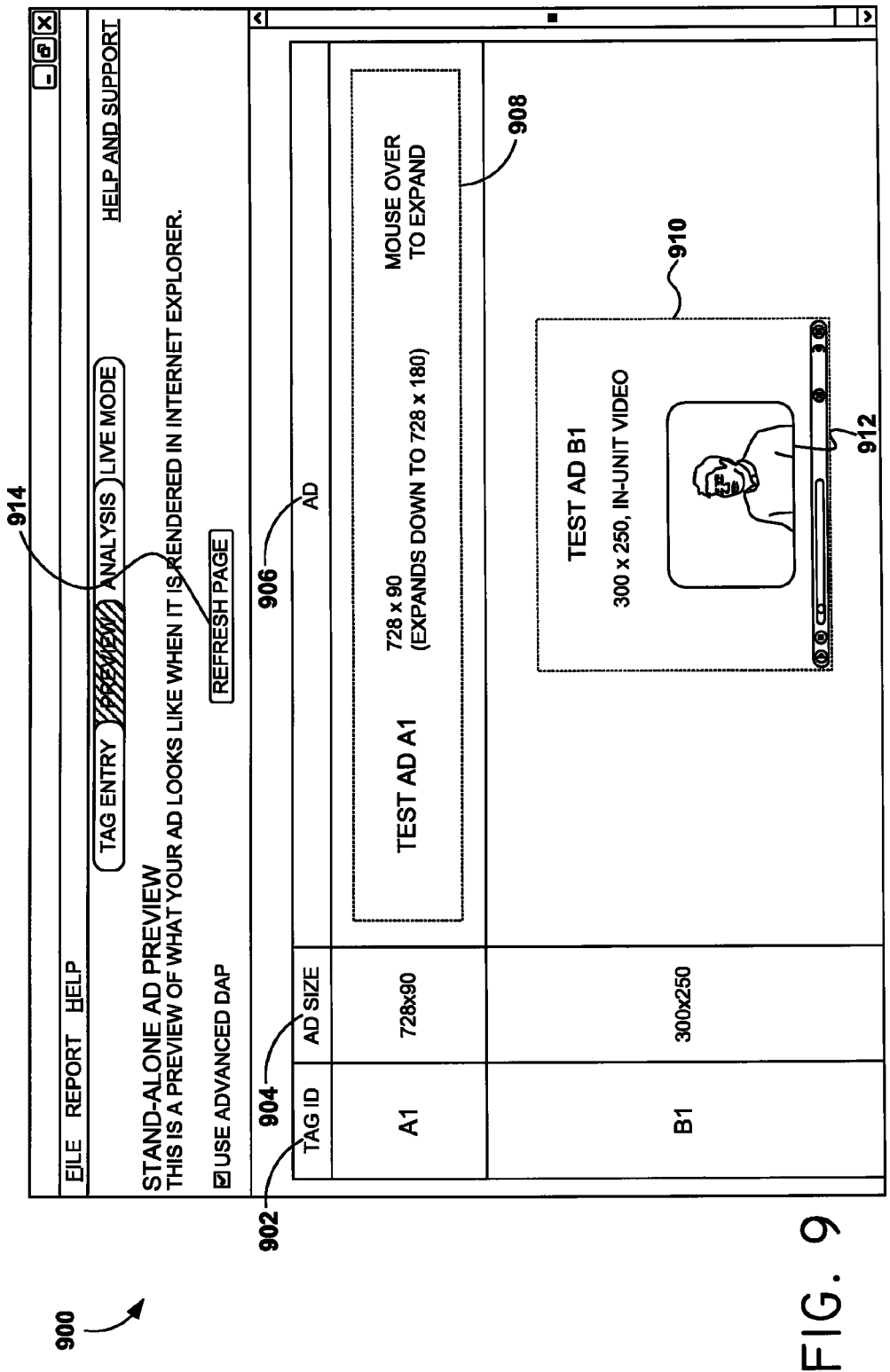
FIG. 9 is an illustrative screen display of an exemplary stand-alone ad testing page of an ad testing tool in accordance with an embodiment of the present invention.

After a user enters one or more ad tags, ad IDs, and/or ad URLs, the user may employ the ad testing tool to test the corresponding ad(s) in a stand-alone mode and/or in a live site testing mode. Turning now to FIG. 9, an illustrative interactive screen display (user interface) 900 for stand-alone ad testing is shown. The stand-alone ad testing page 900 is presented, for instance, when a user selects to perform stand-alone testing. In particular, using the ad tags, ad IDs, and or ad URLs entered in the tag entry page, ads are rendered and displayed in the stand-alone ad testing page to provide a preview of what the ads would look like if rendered and displayed within a particular web browser environment.

The stand-alone ad testing page 900 includes, for each ad, a tag ID area 902 for presenting the tag ID for the ad, an ad size area 904 for presenting the ad size of the ad, and an ad area 906 at which the ad is presented. In the example shown in FIG. 9, two ads have been rendered and displayed. The first ad 908 corresponds with the tag ID A1, while the second ad 910 corresponds with the tag ID B1.

Figure 10:
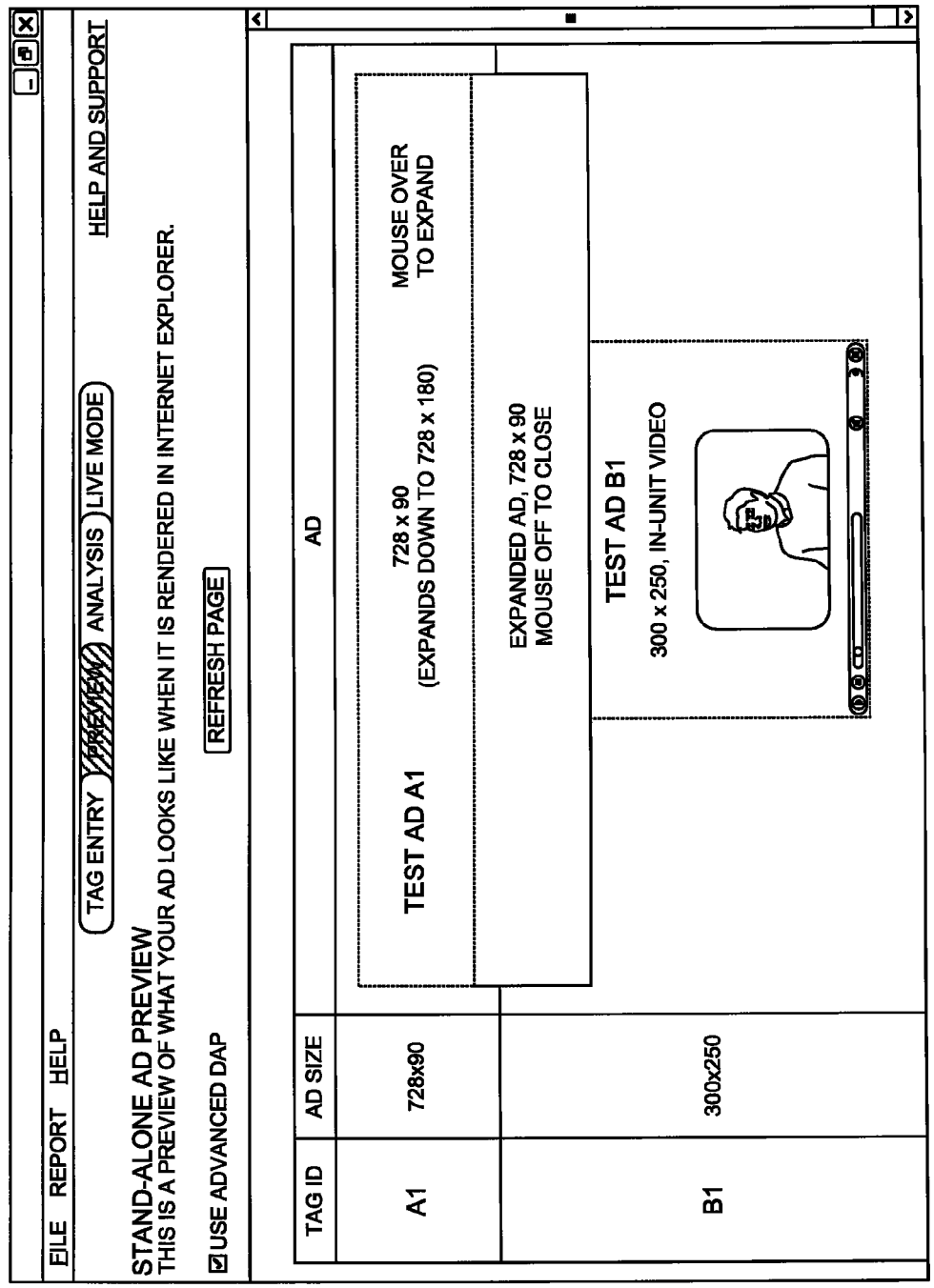
FIG. 10 is another illustrative screen display of an exemplary stand-alone ad testing page of an ad testing tool showing user interaction with an ad rendered in a stand-alone environment in accordance with an embodiment of the present invention.

The stand-alone ad testing page 900 allows the user to test the operation of the rich media ads presented within the page 900. For instance, test ad 908 provides a feature to expand the ad when a user places a cursor over the ad 908. When a user places the cursor over the ad 908, the ad 908 is expand from an ad size of 728×90 shown in FIG. 9 to an ad size of 728×180, as shown in FIG. 10. As another example, test ad 910 illustrates an ad incorporating a video. The user may test the video in the stand-alone environment, for instance, by selecting to play and pause the video, adjust the volume, and/or any other video-related feature provided by the ad 910.

In some embodiments, the stand-alone ad testing feature of the ad testing tool allows the user to rotate ads for refresh testing purposes. As shown in FIG. 9, a refresh page button 914 is provided in the stand-alone ad testing page 900. When a user selects the refresh page button 914, the ad testing tool determines whether there are any ad tags entered for refresh testing purposes. As discussed above with reference to FIG. 7, in an embodiment, the ad testing entry page may provide for the entry of ad tags in pairs. In such an embodiment, when a user selects the refresh page button 914, the currently displayed ad is replaced using the other ad tag in the ad tag pair.

Figure 11:
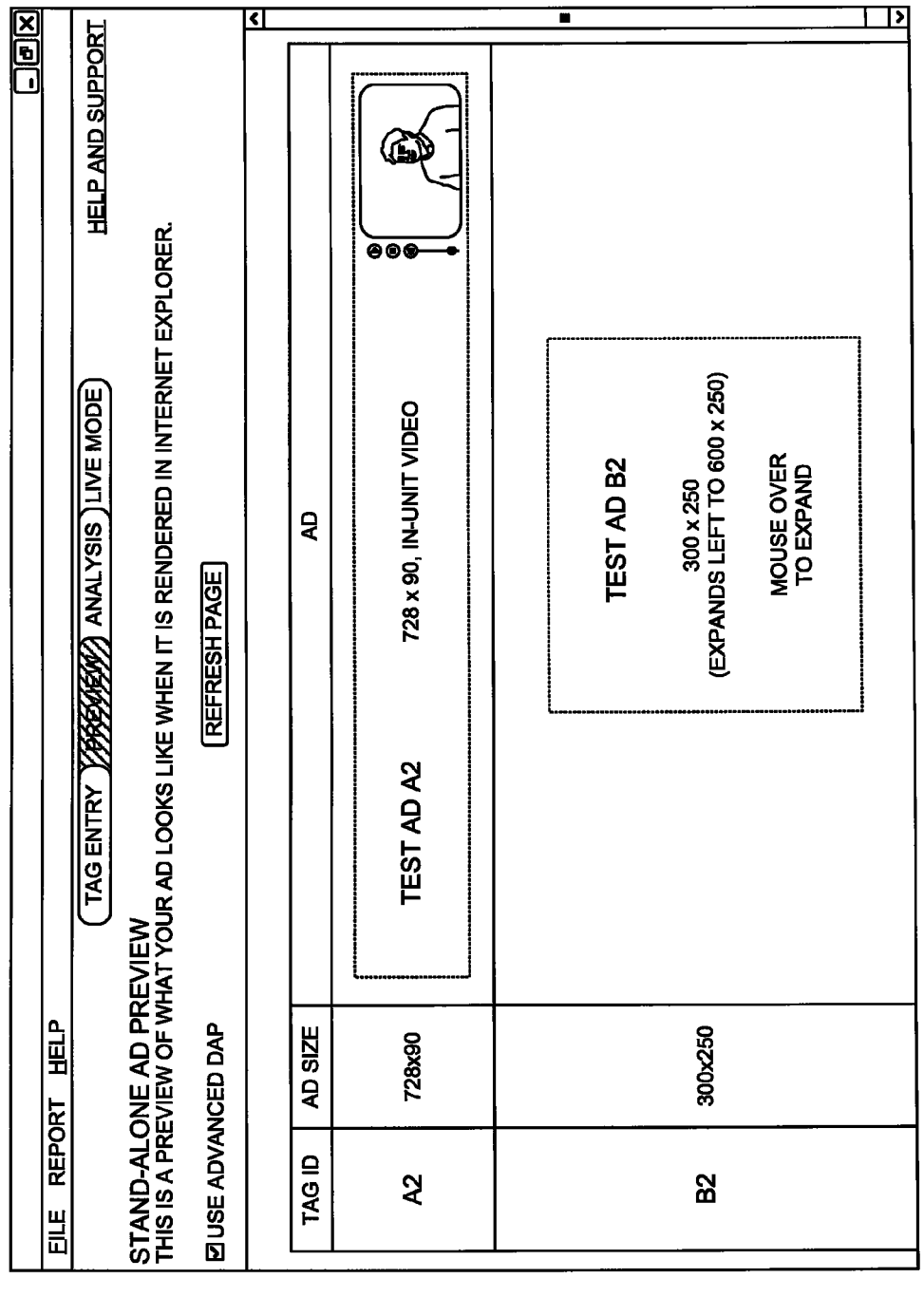
FIG. 11 is another illustrative screen display of an exemplary stand-alone ad testing page of an ad testing tool showing rotation of test ads to simulate a web page refresh in a stand-alone environment in accordance with an embodiment of the present invention.

With reference to FIG. 11, a stand-alone ad testing page 1100 is presented that illustrates the replacement of ads after a refresh page button has been selected by the user. As shown in FIG. 11, ad A1 has been replaced with ad A2, and ad B1 has been replaced with ad B2. The user may interact with each ad to determine wither the ads have been properly rendered and displayed.

Figure 12:
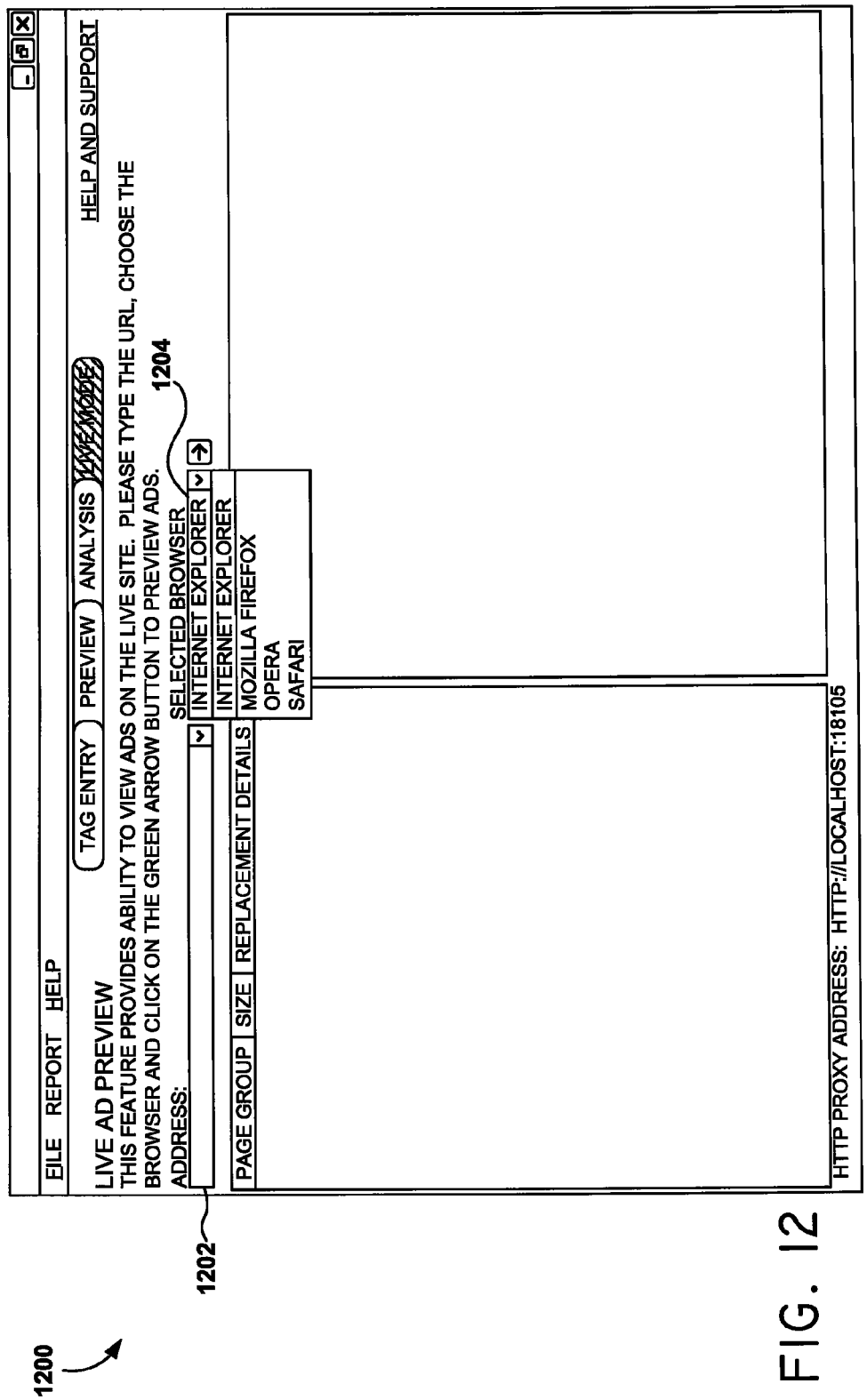
FIG. 12 is an illustrative screen display of an exemplary live site ad testing page of an ad testing tool in accordance with an embodiment of the present invention.

In addition to viewing ads in a stand-alone testing environment, the user may also view ads in a live site. FIG. 12 illustrates an interactive screen display (user interface) 1200 for live site testing purposes. The live site testing page 1200 includes a web address entry area 1202 that allows a user to enter a URL for a web page at which the user wishes to view a test ad. Additionally, the live site testing page 1200 includes a browser selection area 1204, which includes a drop-down box listing available web browsers. The ad testing tool may determine which web browsers are installed on the user's device and present the available web browsers within the drop-down box in the browser selection area 1204. Using the browser selection area 1204, the user may specify a web browser for rendering and displaying a test ad within a target web page specified by a URL entered in the wed address entry area 1204.

Figure 13:
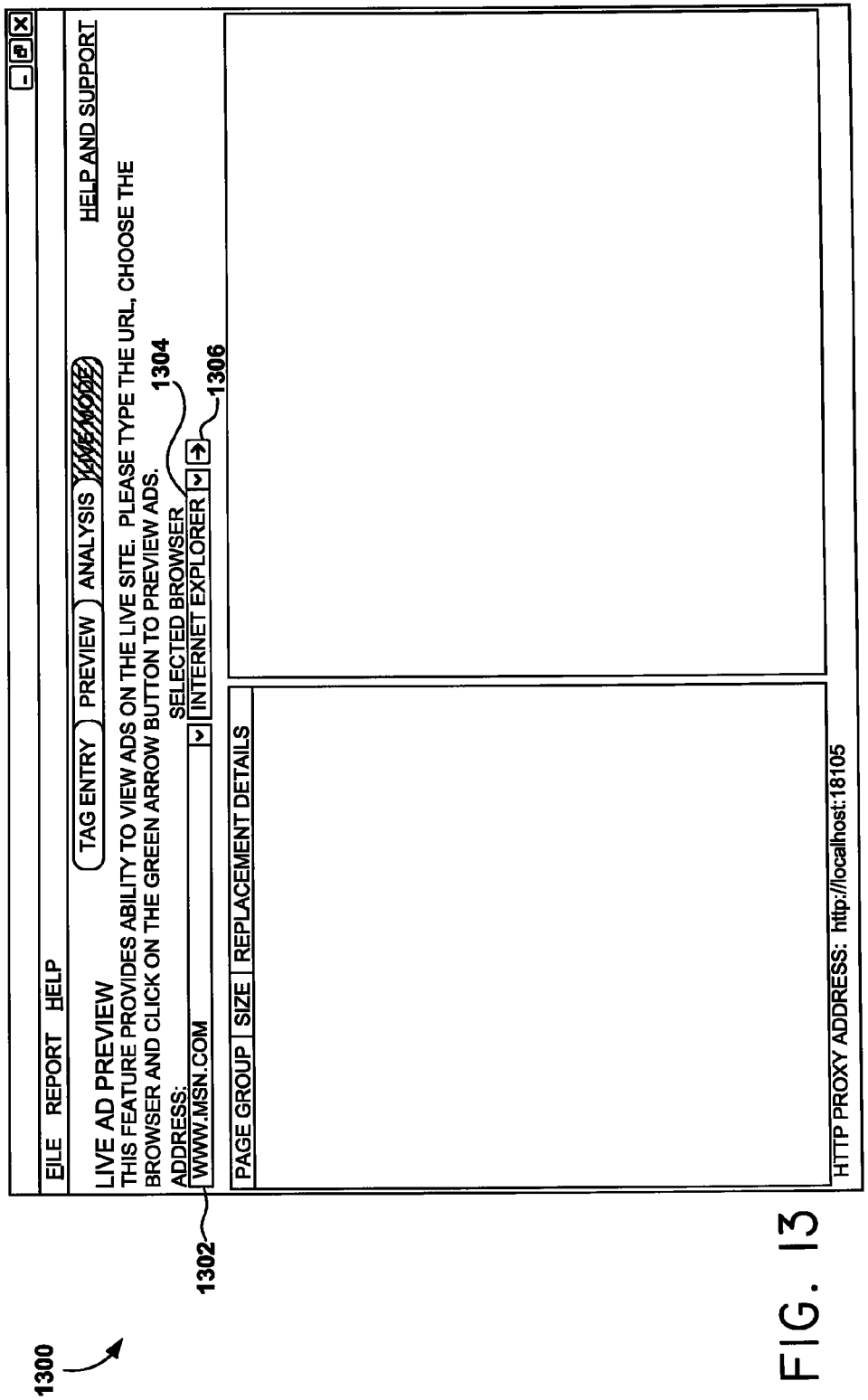
FIG. 13 is another illustrative screen display of an exemplary live site ad testing page of an ad testing tool showing entry of a URL for a web page in which to render a test ad in accordance with an embodiment of the present invention.

By way of illustration, FIG. 13 illustrates a live site testing page 1300 in which a user has entered the URL "www.msn.com" in the web address entry area 1302 and the user has selected the INTERNET EXPLORER web browser in the browser selection area 1304. After entering the URL and specifying the desired web browser, the user selects the button 1306 to cause the selected web browser to be launched and the specified URL to be rendered and displayed with a test ad.

Figure 14:
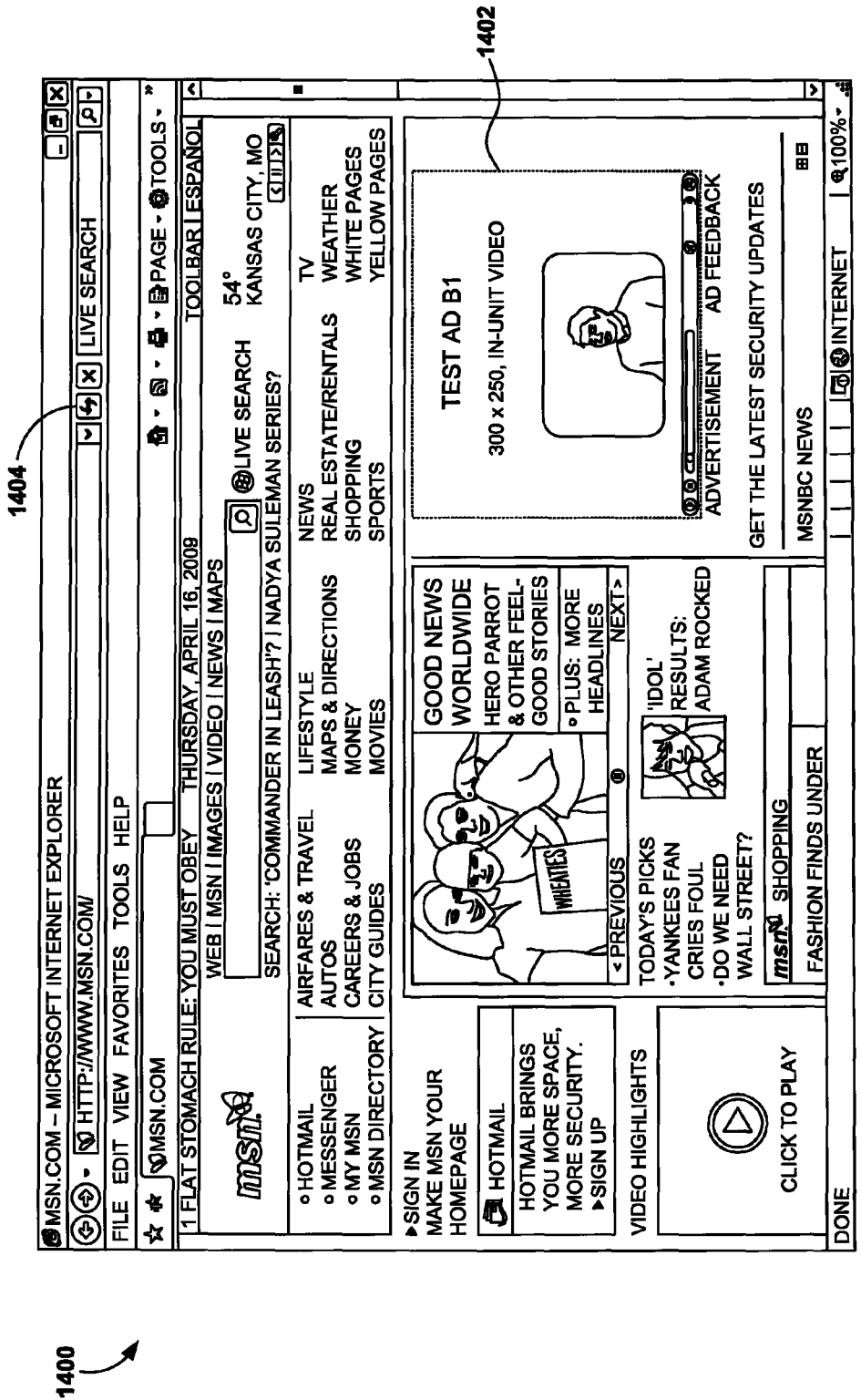
FIG. 14 is an illustrative screen display of an exemplary web page including a test ad added using an ad testing tool in accordance with an embodiment of the present invention.

As shown in the screen display 1400 of FIG. 14, when the user selects the button 1306 in FIG. 3, the INTERNET EXPLORER web browser is launched, and the URL "www.msn.com" is requested and displayed in the web browser. Additionally, the ad testing tool operates as described in particular detail above to identify ads in the web page and replace the ads with test ads entered by the user into the ad testing tool. In the present example, the web page corresponding with the URL "www.msn.com" includes an ad space 1402 that provides an area for presenting ads having an ad size of 300×250. As such, the ad testing tools has identified this ad size and also identified a test ad with a matching ad size. As shown in FIG. 14, the ad testing tool has replaced the ad in the web page using test ad B1, which has an ad size of 300×250.

By rendering and presenting the test ad in the web page, the ad testing tool allows the user to determine whether the test ad renders properly on a live site. If appropriate, the user may interact with the rich media ad. For instance, in the example of FIG. 14, an in-video test ad is presented. The user may interact with the ad by playing the video and/or using any other video-related feature provided within the ad.

Figure 15:
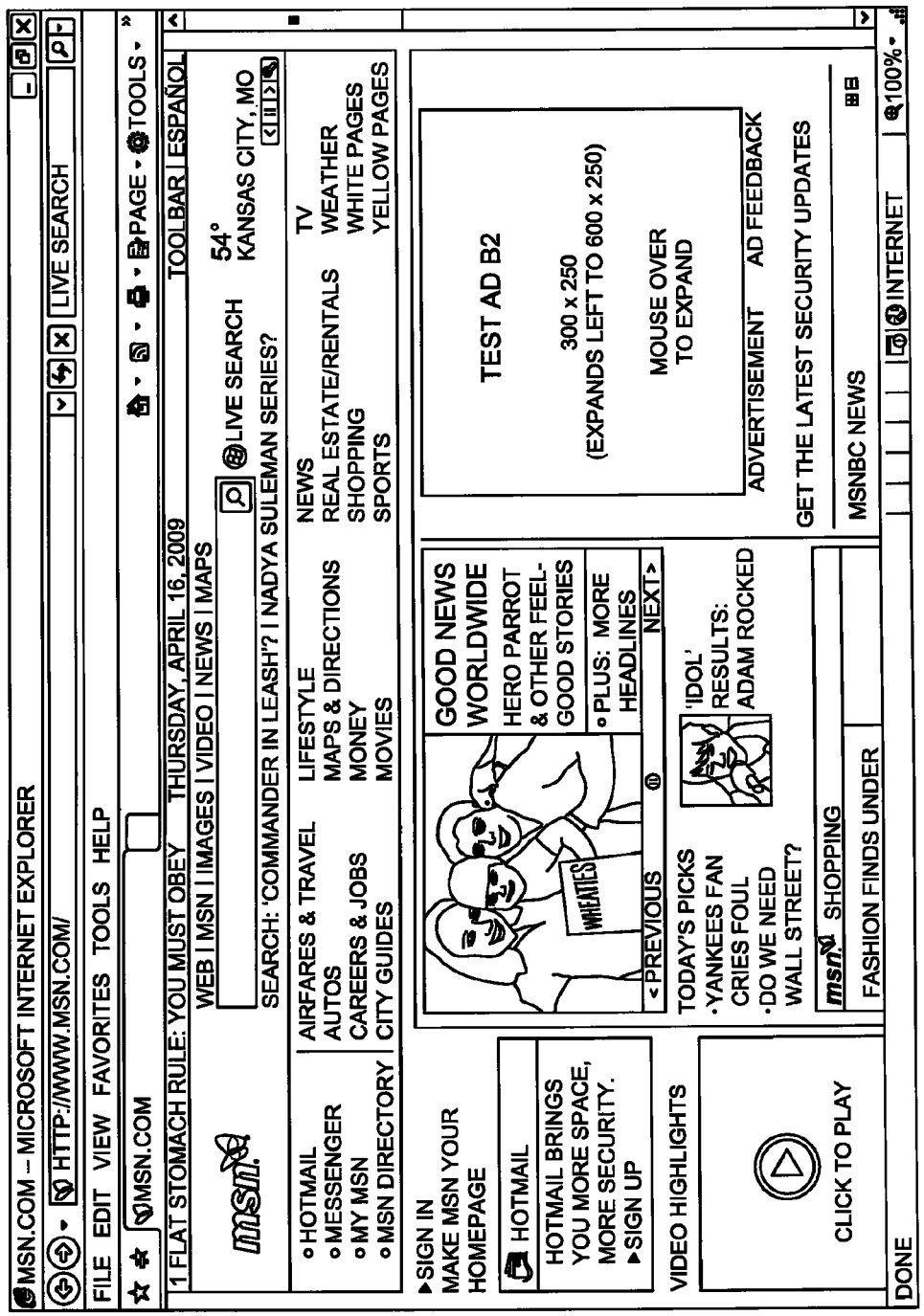
FIG. 15 is another illustrative screen display of an exemplary web page including a test ad added upon refresh of the web page using an ad testing tool in accordance with an embodiment of the present invention.
Figure 16:
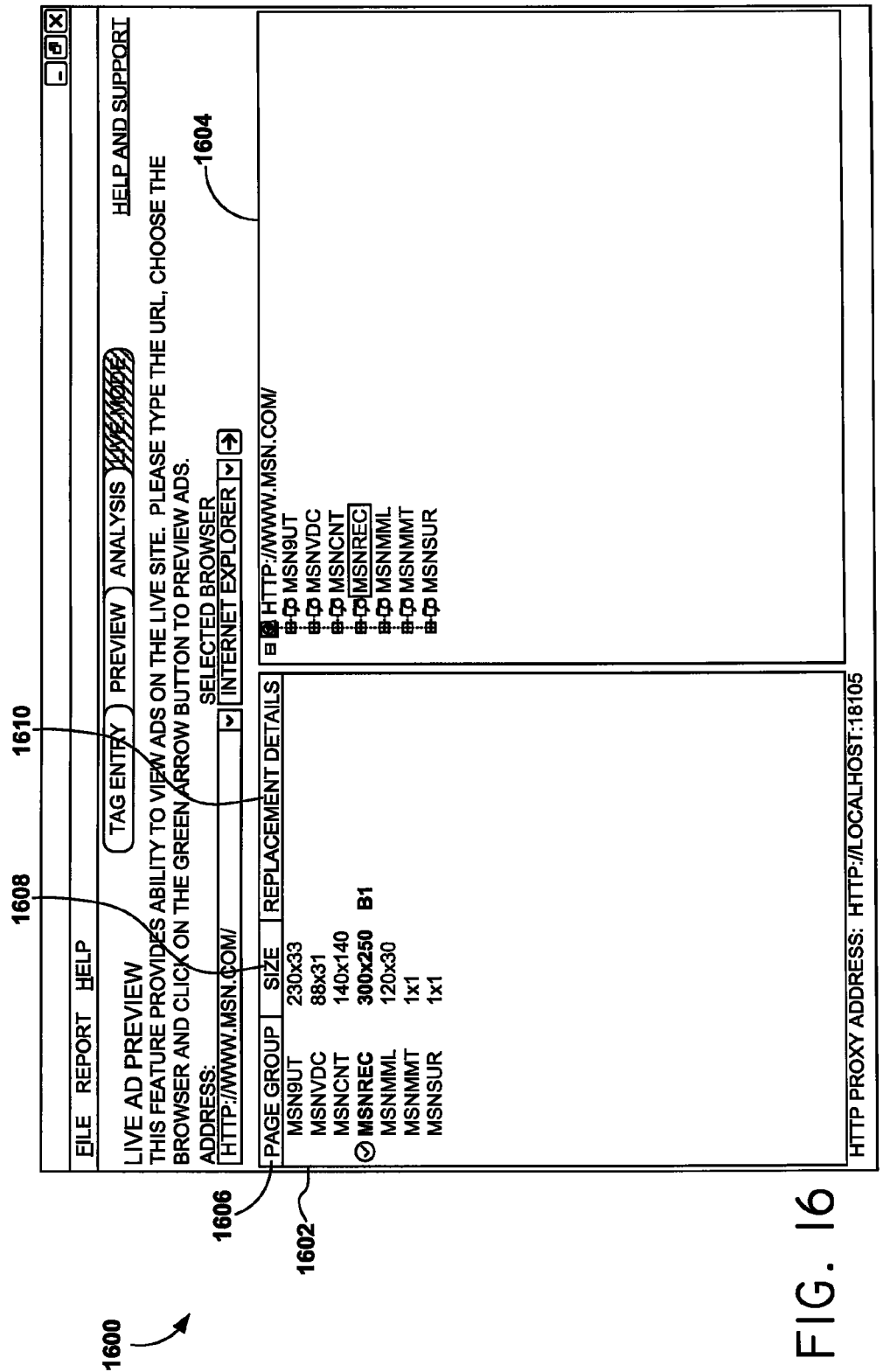
FIG. 16 is an illustrative screen display of an exemplary live site ad testing page of an ad testing tool showing ad replacement tracking information in accordance with an embodiment of the present invention.

In embodiments, the ad testing tool replaces test ads upon refreshing a web page. For instance, if the user were to select refresh button 1404 in FIG. 14 or if the web page presented in FIG. 14 were otherwise refreshed, test ad B1 in ad space 1402 may be replaced with another test ad. By way of illustration, FIG. 15 illustrates a screens display 1500 showing a new test ad B2 that replaces test ad B1 upon refresh. The user may interact with the new test ad B2 to examine whether the new ad has been rendered properly. For instance, the user may place the cursor over the test ad B2 to expand the ad.

In some embodiments, the ad testing tool tracks web pages that have been presented and the ads within those web pages that have been replaced with test ads. For instance, with reference to FIG. 16, a live site ad testing page 1600 is presented that includes ad replacement tracking areas 1602 and 1604. In the ad replacement tracking area 1602, an ad page group listing 1606 is provided with an identification of an ad size 1608 for each ad page group and replacement details 1610 for each ad page group. A page group for which an ad has been replaced with a test ad may be displayed with a visual characteristic indicating the replacement. In the present example, the page group "MSNREC" is presented with bold text and with a check mark, indicating that a test ad was used. Additionally, the replacement details for the page group indicate that text ad B1 was used. Ad replacement tracking area 1604 presents further ad replacement information. In particular, the ad replacement tracking area 1604 lists web pages presented and the page groups within each web page. A page group for which an ad has been replaced with a test ad may be presented using a particular visual characteristic. For instance the page group "MSNREC" has been presented with a box around the text to indicate that a test ad was used. The user may drill down to view further information by selecting a particular page. For instance, although not shown in FIG. 16, the user may select the page group "MSNREC" to view details regarding the operation of the ad replacement, such as interception of the original ad request from the web page, the detection of the ad size, and replacement with an ad tag for a test ad.

As can be understood, embodiments of the present invention provide an ad test tool that allows rich media developers to test rich media ads in both a stand-alone environment and within live web pages.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-storage medium including computer-useable instructions that, when performed by a computing device, cause the computing device to perform a method for testing an ad in a web page, the method comprising:
receiving, in a test ad tool on a local computing device, a selection of a test ad stored in memory of the local computing device;
on the local computing device, receiving, from a user, a selection of a web page for testing the test ad;
receiving the web page, wherein the web page includes an ad markup for an ad from a remote advertising delivery system, the ad markup causing an ad request to be generated;
intercepting, via a proxy on the local computing device, the ad request;
replacing, on the local computing device, the ad markup in the web page with an ad markup for the test ad; and
on the local computing device, displaying the test ad in the web page using the ad markup for the test ad.

2. The computer-storage medium of claim 1, wherein receiving a test ad comprises receiving an ad tag for the test ad.

3. The computer-storage medium of claim 1, wherein receiving a test ad comprises receiving an ad ID for the test ad.

4. The computer-storage medium of claim 1, wherein receiving a test ad comprises receiving a URL for the test ad.

5. The computer-storage medium of claim 1, wherein the method further comprises receiving a selection of a web browser for presenting the web page with the test ad.

6. The computer-storage medium of claim 1, wherein the method further comprises determining that a URL for the ad request corresponds with a predetermined URL.

7. The computer-storage medium of claim 1, wherein the method further comprises:
determining an ad size corresponding with the ad markup for the ad from the advertising delivery system; and
selecting the test ad based on a determination that the test ad has an ad size matching the ad size corresponding with the ad markup for the ad from the advertising delivery system.

8. A computer-storage medium storing a system for testing an ad, the system including a plurality of software components, the plurality of software components comprising:
one or more processors;
a test ad entry component, executable by the one or more processors, allowing a user to enter one or more test ads;
a stand-alone ad test component, executable by the one or more processors, that facilitates testing the one or more ads using a rendering framework of an advertising delivery system in a stand-alone environment; and
a live site ad test component, on a local computing device and executable by the one or more processors, that facilitates replacing one or more ads on a live web page with at least one of the one or more test ads selected, by a user, from ads stored in memory of the local computing device.

9. The computer-storage medium of claim 8, wherein the test ad entry component allows the user to enter one or more ad tags for the one or more test ads.

10. The computer-storage medium of claim 8, wherein the test ad entry component allows the user to enter one or more ad IDs for the one or more test ads.

11. The computer-storage medium of claim 8, wherein the test ad entry component allows the user to enter one or more URLs at which the one or more test ads are located.

12. The computer-storage medium of claim 8, wherein the stand-alone ad test component includes a refresh testing feature that replaces a rendered test ad with another test ad.

13. The computer-storage medium of claim 8, wherein the live site ad test component includes a proxy that monitors web traffic, identifies an ad request for at least one of the one or more ads for the live web page, and provides the at least one of the one or more test ads for rendering within the live web page.

14. The computer-storage medium of claim 13, wherein the proxy identifies an ad size of the at least one of the one or more ads for the live web page and the live site ad test component provides the at least one of the one or more test ads based on a determination that an ad size of the at least one of the one or more test ads matches the ad size of the at least one of the one or more ads for the live web page.

15. The computer-storage medium of claim 8, wherein the software components further comprise a rules and compliancy engine that checks the one or more ads for security and privacy compliancy.

16. The computer-storage medium of claim 8, wherein the software components further comprise a rules and compliancy engine that checks the one or more ads for at least one selected from the following: click tracking compliancy; and impression tracking compliancy.

17. A computer-implemented method for testing an ad using an ad test tool, the method comprising:
receiving, in a test ad tool on a local computing device, a selection of a test ad stored in memory of the local computing device;
rendering and displaying the test ad in a stand-alone environment using a rendering framework of an advertising delivery system provided locally by the ad test tool;
replacing, on the local computing device, the rendered and displayed test ad with a second test ad by rendering and displaying the second test ad;
on the local computing device, receiving a selection, from a user, of a web page for testing the test ad;
receiving the web page, wherein the web page includes an ad markup for an ad from a remote advertising delivery system, the ad markup causing an ad request to be generated;
intercepting, via a proxy on the local computing device, the ad request;
determining an ad size corresponding with the ad markup for the ad from the advertising delivery system;
selecting the test ad based on a determination that the test ad has an ad size matching the ad size corresponding with the ad markup for the ad from the advertising delivery system;
replacing the ad markup in the web page with an ad markup for the test ad; and
on the local computing device, rendering and displaying the test ad in the web page using the ad markup for the test ad.

18. The method of claim 17, wherein receiving a test ad comprises receiving at least one selected from the following: an ad tag for the test ad; an ad ID for the test ad; and a URL for the test ad.

19. The method of claim 17, wherein the method further comprises receiving a selection of a web browser for presenting the web page with the test ad.

20. The method of claim 17, wherein the method further comprises determining that a URL for the ad request corresponds with a predetermined URL.

\* \* \* \* \*